June 16, 1925.
J. L. AZBILL
1,541,888
COTTON PICKER'S TRUCK
Filed Jan. 22, 1923   6 Sheets-Sheet 3
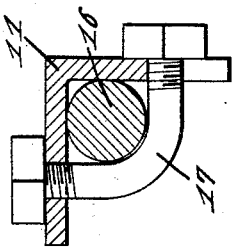
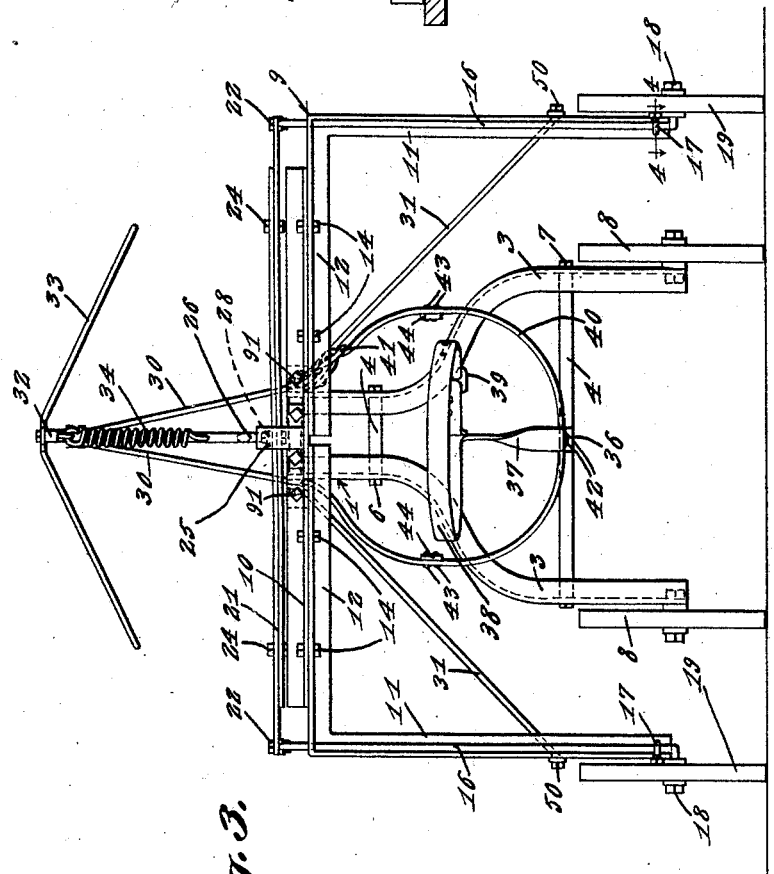

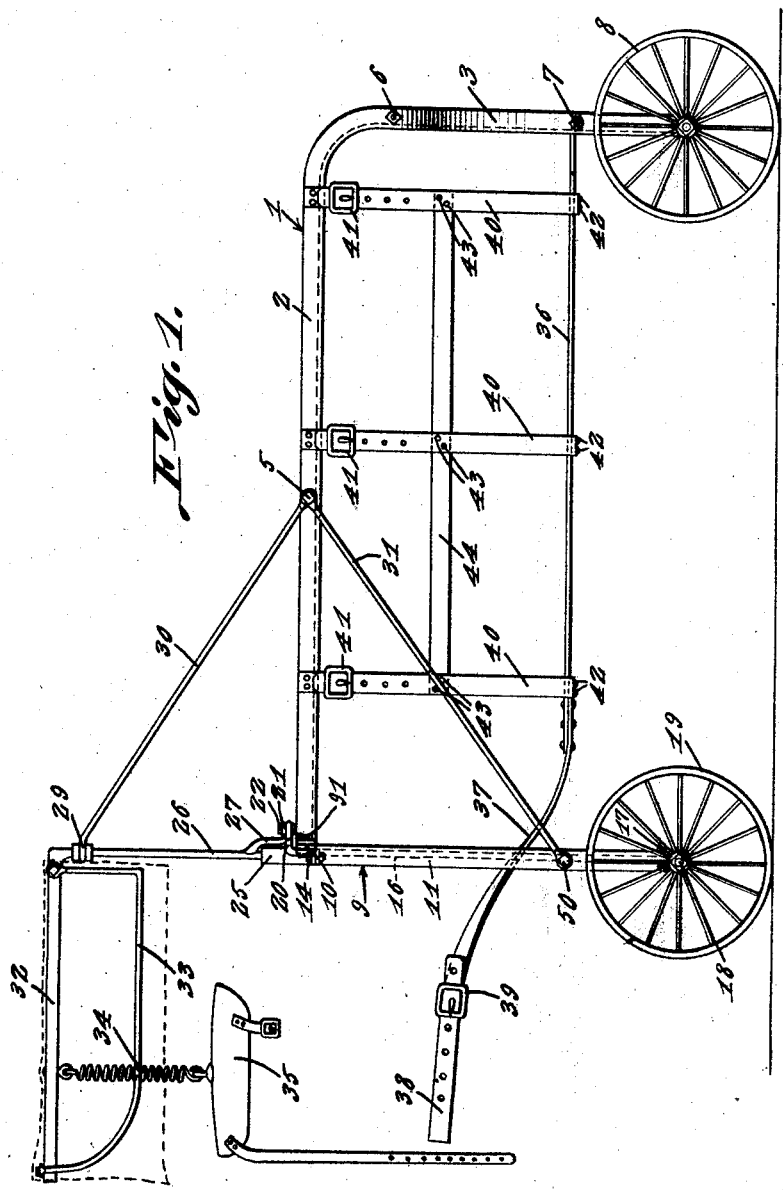

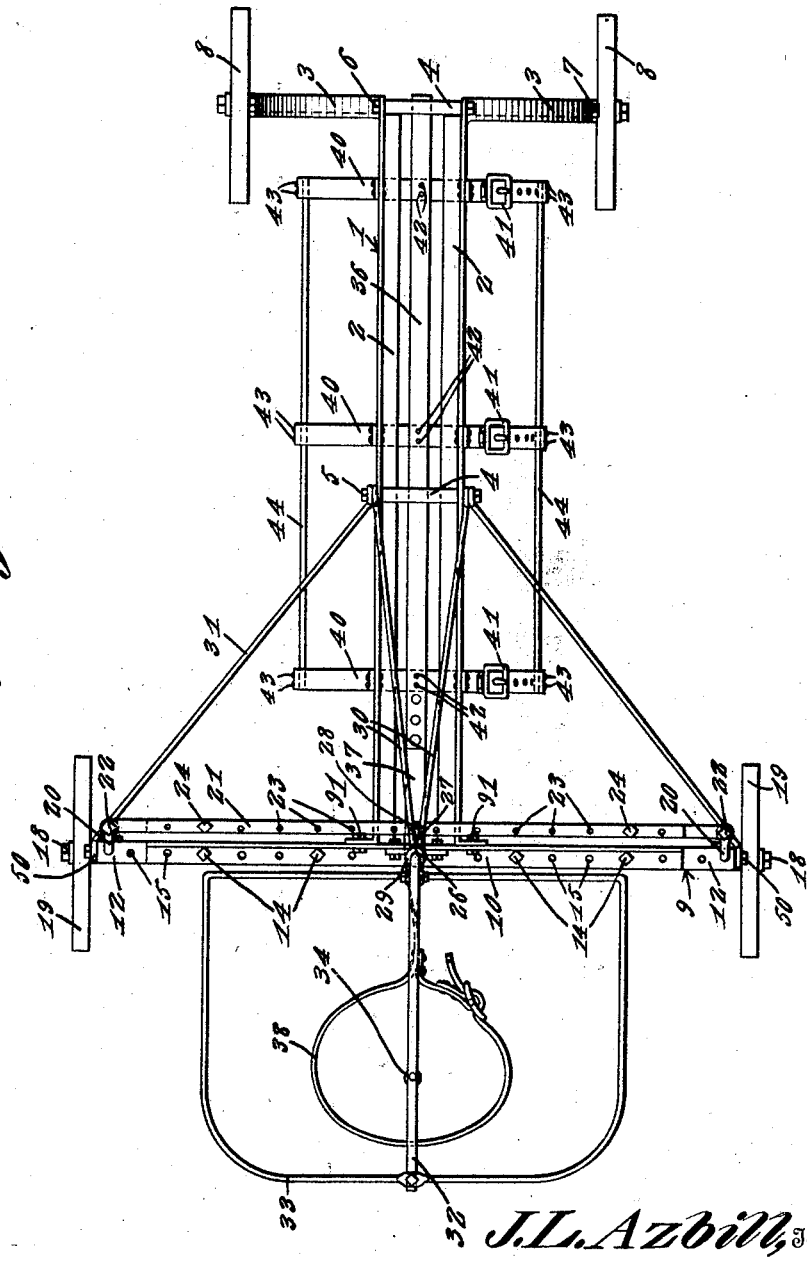

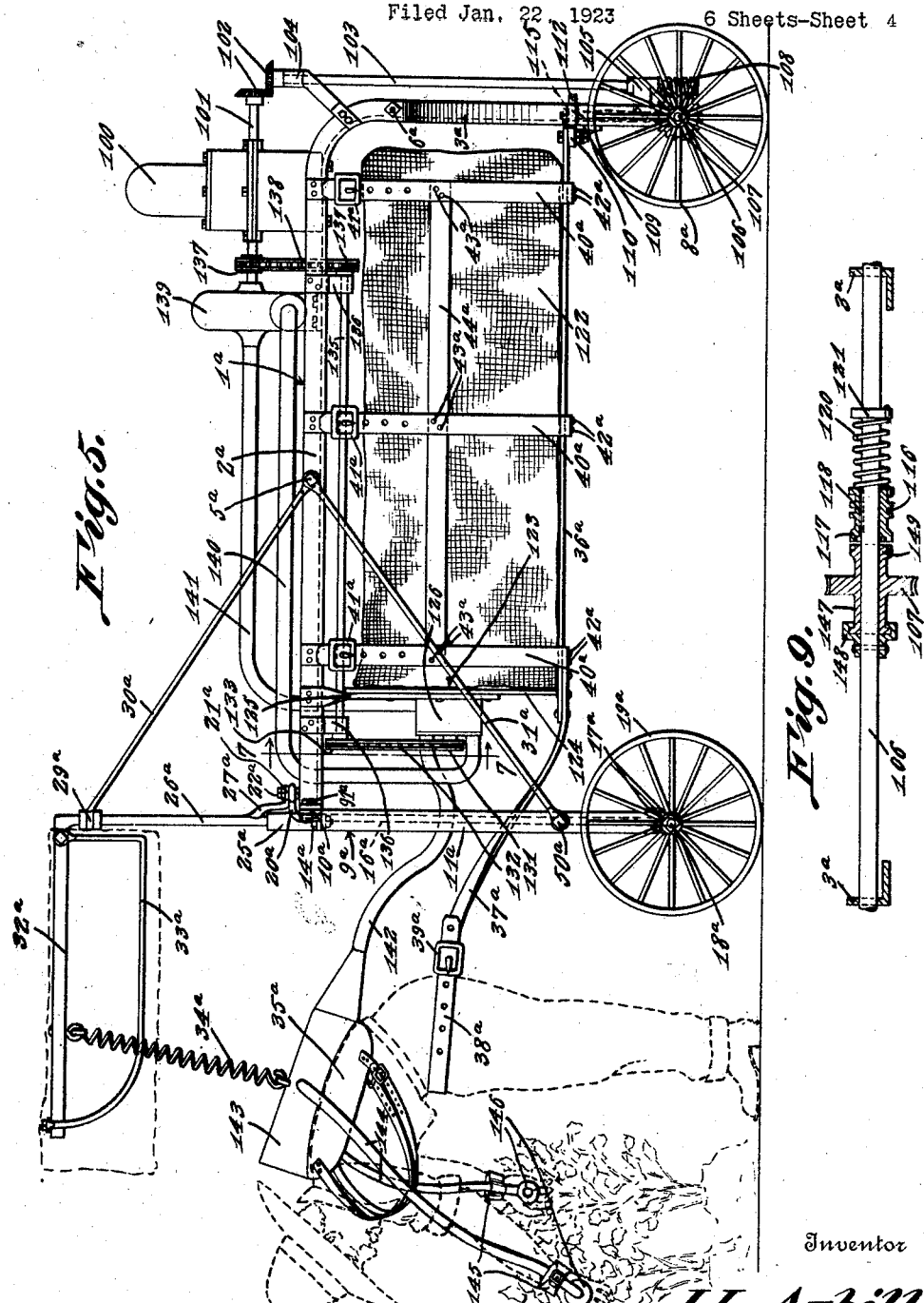

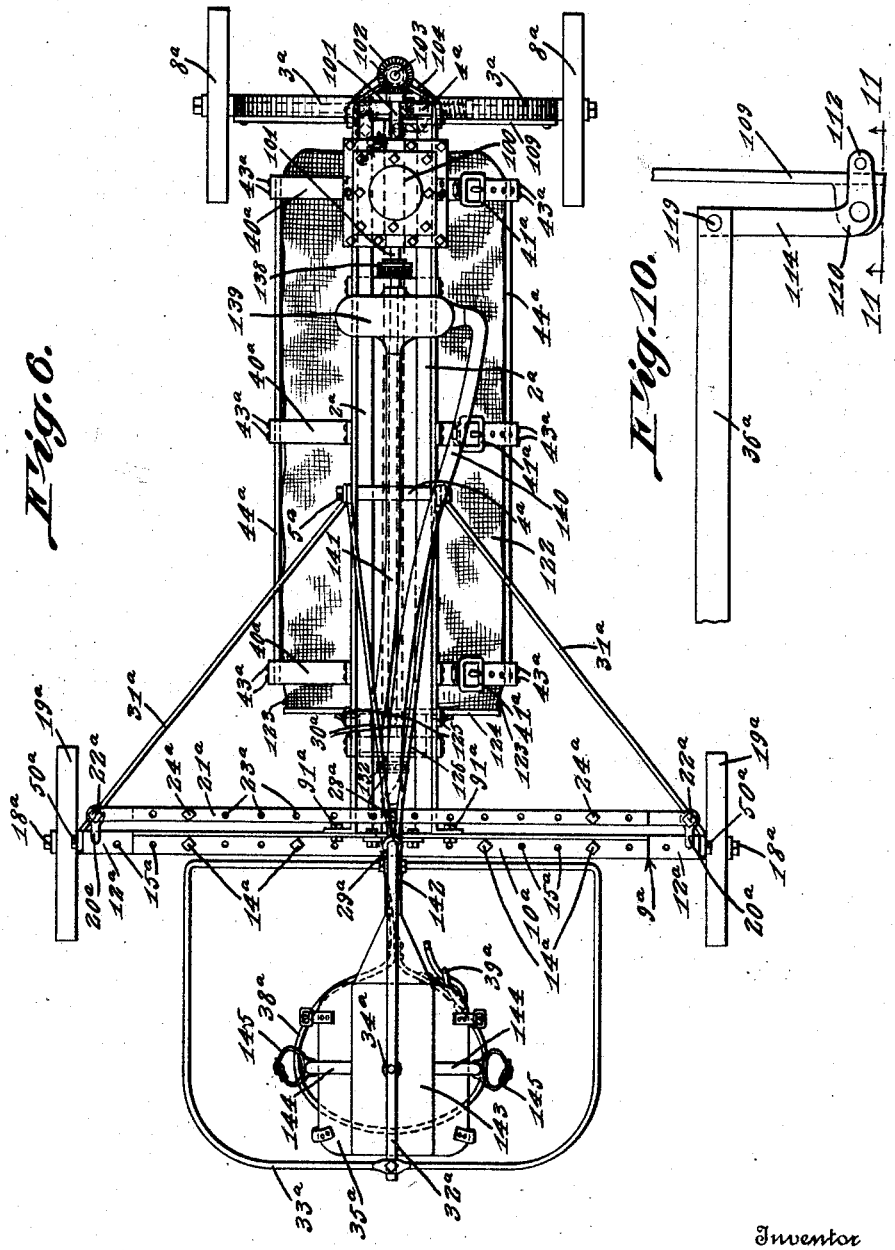

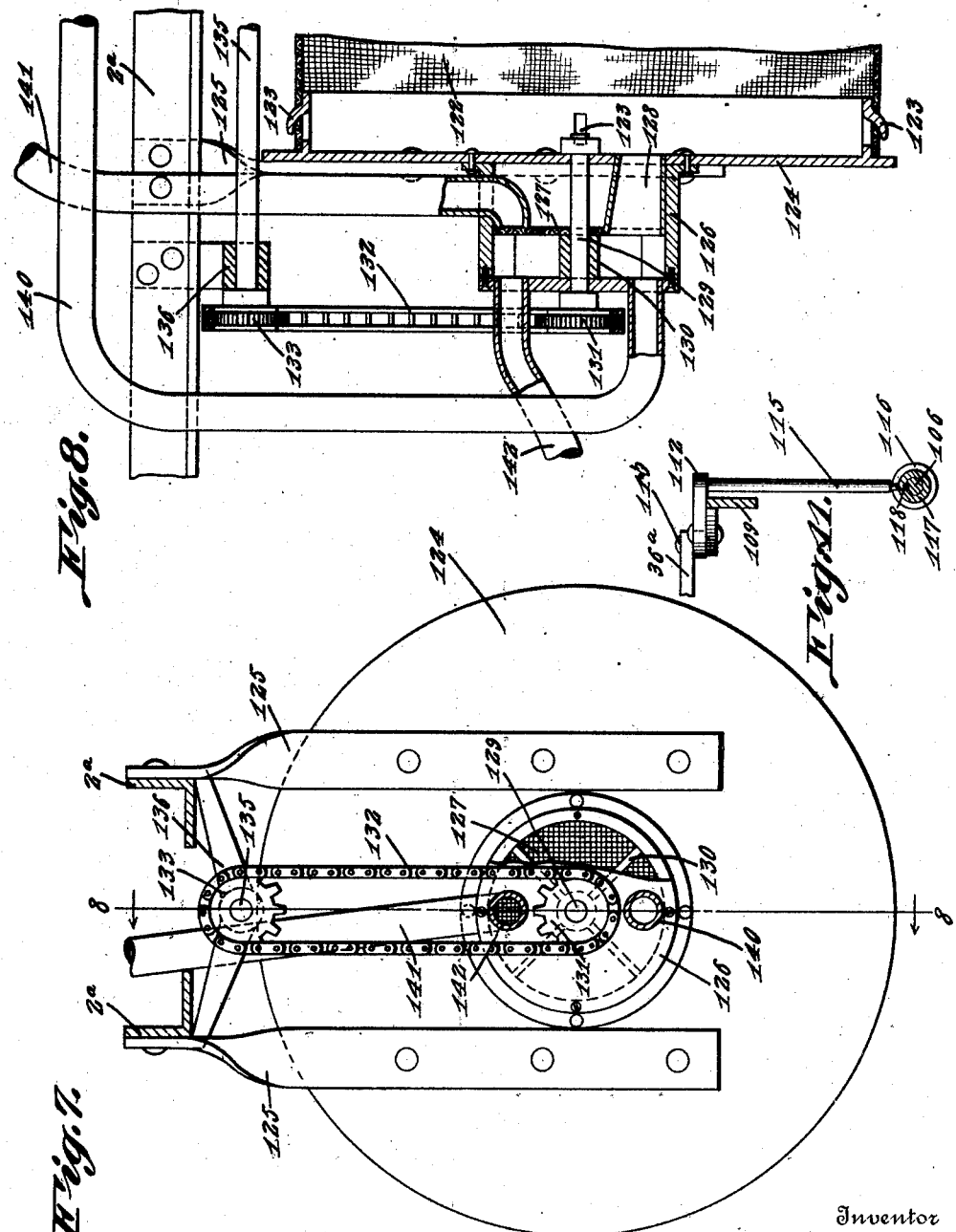

Patented June 16, 1925.

1,541,888

UNITED STATES PATENT OFFICE.

JOHN L. AZBILL, OF LEXINGTON, TENNESSEE, ASSIGNOR OF ONE-HALF TO J. W. ROBERTS, OF LEXINGTON, TENNESSEE.

COTTON-PICKER'S TRUCK.

Application filed January 22, 1923. Serial No. 614,243.

*To all whom it may concern:*

Be it known that I, JOHN L. AZBILL, a citizen of the United States, residing at Lexington, in the county of Henderson and State of Tennessee, have invented a new and useful Cotton-Picker's Truck, of which the following is a specification.

This invention aims to provide a simple form of truck which may be drawn along by a person who is picking cotton, it being unnecessary to drag the cotton sack over the ground, novel means being provided for steering the vehicle, and novel means being provided for assembling the vehicle with the body of the operator, in such a way that the body of the operator will be supported yieldingly.

Another object of the invention is to provide novel means whereby the cotton may be picked by suction, novel means being provided for propelling the truck and for starting and stopping the truck, at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a top plan wherein parts have been omitted; Figure 3 is a front elevation wherein parts have been omitted; Figure 4 is a section on the line 4—4 of Figure 3; Figure 5 is a side elevation showing a modified form of the invention; Figure 6 is a top plan; Figure 7 is a cross section on the line 7—7 of Figure 5; Figure 8 is a section on the line 8—8 of Figure 7; Figure 9 is a sectional view illustrating the clutch mechanism and associated details; Figure 10 is a fragmental plan showing the lever which operates the clutch; Figure 11 is a section on the line 11—11 of Figure 10.

In carrying out the invention, there is provided a main frame 1 including a top member, which may be made up of parallel bars 2 having ends 3 which extend downwardly as shown in Figure 1, and outwardly as shown in Figures 2 and 3, spacers 4 being interposed between the bars 2 and their ends 3, a securing element 5 passing through the bars 2 and the corresponding spacer 4, securing elements 6 and 7 passing through the depending, laterally extended ends 3 of the bars 2, and through the corresponding spacers, the spacers and the securing elements constituting ties which unite the bars 2 and their ends 3. Rear ground wheels 8 are journaled on the lower extremities of the depending ends 3 of the bars 2.

An arched member 9 is supplied and may be made up of angle elements. The arched member 9 embodies a bridge 10 and standards 11, the standards being vertically disposed and having inwardly extended arms 12 overlapped upon the bridge 10 and held thereto by securing elements 14, the bridge 10 and the arms 12 of the standards 11 being supplied with a plurality of openings 15 adapted to receive the securing elements 14, thereby to adjust the width of the machine at the forward end thereof. The forward ends of the bars 2 of the top member are connected at 91 to the bridge 10.

Vertical shafts 16 are located in the angles of the standards 11 and are journaled in bearings 17 on the standards. At their lower ends, the shafts 16 have outwardly extended axles 18 whereon forward ground wheels 19 are journaled, and since the width of the machine, at the forward end thereof, may be varied as hereinbefore explained, the distance between the forward ground wheels 19 may be adjusted accordingly. The shafts 16 extend upwardly through the arms 12 of the standards 11 and are journaled therein, the upper extremities of the shafts carrying rearwardly extended crank arms 20, whereunto the ends of a longitudinally extensible drag link 21 are pivoted at 22, the drag link being extensible, so that the length thereof may be adjusted when the width of the arched member 9 is decreased or increased to vary the distance between the forward ground wheels 19. The drag link 21 may consist of overlapped parts having a plurality of openings 23 adapted to receive securing devices 24.

A bearing 25 is mounted on the intermediate portion of the bridge 10, and therein a vertically disposed, upwardly extended shaft 26 is journaled, the shaft being supplied adjacent to its lower end with a rearwardly extended crank arm 27 which is pivoted at 28 to the intermediate portion of the drag link 21. Adjacent to its upper end, the vertical shaft 26 is journaled in a bearing 29 sustained by downwardly diverging braces 30 held upon the bars 2 of the main frame 1 by the securing element 5. This securing element 5 retains, likewise, the upper ends of downwardly diverging braces 31 which are connected at their lower ends, as indicated at 50, to the standards 11. The upper end of the shaft 26 carries a forwardly extended support 32 whereon is mounted a frame 33, adapted to carry a canopy, shown in dotted line in Figure 1. The upper end of a depending retractile spring 34, of considerable strength, is attached to the support 32, the lower end of the spring carrying a harness 35.

The rear end of a tongue 36 is secured to the spacer 4 which is carried by the securing element 7 and extends forwardly. To the forward end of the tongue 36, a towing element, such as a strap 37, is attached. Any suitable means may be provided for connecting the towing element 37 to the body of the operator. If preferred, the towing element 37 may be formed into a loop 38 held by a buckle 39. The element 37 and the tongue 36 form a draft means for the truck or vehicle. The truck or vehicle is adapted to carry a picking sack (not shown), and with this end in view, suspension members 40, which may be flexible straps, are connected to one of the bars 2, the suspension members being formed into loops, held on the other of the bars 2 by buckles 41 or the like. The suspension members 40 are secured as at 42, intermediate their ends, to the tongue 36, the side portions of the suspension members being secured at 43 to rigid bars or supports 44 which extend horizontally, it being obvious that within the cage formed by the tongue 36, the suspension members 40 and the bars 44, the picking sack may be located and supported.

The harness 35 and the spring 34 serve to support the body of the operator during the picking operation, the truck or vehicle being drawn along by means of the towing element 37 and parts associated therewith. When the body of the operator is swung laterally, rotation will be imparted to the shaft 26 by way of the support or arm 32 and when the shaft 26 is rotated, the crank arm 27 on the shaft coacting with the drag link 21 and the crank arms 20 of the shafts 16, will impart rocking movement to the shafts, the angle between the forward wheels 19 and the draft line being altered, and a steering of the vehicle thus being brought about.

The general construction of the device is such that it is unnecessary for the operator to drag the picking sack over the ground, in accordance with a known practice, the cotton, having been picked, being cast rearwardly into the sack (not shown) which is supported by the parts 36, 40 and 44.

Passing to the form shown in Figures 5 to 11, the truck is of the general form hereinbefore described, and parts hereinbefore alluded to have been designated by numerals previously used, with the suffix "a".

The prime mover 100, such as an internal combustion engine, is mounted on the frame bars 2ª of the vehicle. The shaft 101 of the engine 100 is connected by beveled pinions 102 with a vertical shaft 103 journaled in an upper bearing 104 and in a lower bearing 105 carried by the frame work of the machine. The rear wheels 8ª of the vehicle are secured to an axle 106, journaled in the depending ends 3ª of the frame bars 2ª. A sleeve 147 is rotatable on the axle 106, and is held against movement longitudinally of the axle by a collar 148 on the axle. The sleeve 147 carries a worm wheel 107 cooperating with a worm 108 on the vertical shaft 103. The sleeve 147 has a clutch member 149, adapted to cooperate with a clutch member 117 splined at 118 to the axle 106, for rotation therewith and for longitudinal movement thereon. A retractile spring 120 is connected to the clutch member 117 and to a shoulder 121 on the axle 106, and tends to retract the clutch member 117 out of engagement with the clutch member 149. A support 109 connects the depending frame parts 3ª, a bell crank lever 110 being fulcrumed upon the support 109. The bell crank lever 110 includes a rearwardly extended arm 112 and a transversely extended arm 114, the arm 112 having a depending finger 115 received in a circumscribing groove 116 formed in the clutch member 117. A tongue 36ª is pivoted at 119 to the transverse arm 114 of the bell crank lever 110.

The sack 122 is detachably connected at 123 to a head 124, the sack and the head constituting a receptacle for the cotton. The head 124 is supported from the frame bars 2ª by hangers 125. As shown in Figure 8, the head 124 is provided with a forwardly prolonged extension 126 wherein a transverse screen 127 is located, the spout 128 extending through the screen. The shaft 129 is journaled in the forward end of the extension 126 and in the head 124, the shaft carrying a rotatable member 130, comprising a plurality of radial blades, the said rotatable member being located between the screen 127 and the forward end of the extension 126. The shaft 129 carries a sprocket wheel 131, about which is engaged a chain 132, cooperating with the sprocket wheel 133 on a shaft 135 journaled at 136 in bearings on the frame of the truck. Sprocket wheels 137 and a chain 138 establish connection between the shaft 101 of the engine 100 and the shaft 135.

A combined suction and blower 139 is mounted on the frame bars 2ª. A blast conduit 140 leads from the suction and blower device 139 and communicates with the forward end of the extension 126 on the head 124, as shown in Figure 8, the blast conduit discharging transversely of the rotatable member 130 into the spout 128. A suction conduit 141 connects the member 139 with the extension 126, the suction conduit entering the extension to the rear of the screen 127. A flexible tube 142 is mounted in the end of the extension 126, the rotatable member 130 operating between the rear end of the tube 142 and the lower end of the suction conduit 141. Owing to the fact that the rotatable member 130 comprises a plurality of radial blades, the suction through the conduit 141 and through the tube 142 will in nowise be interfered with by the blast proceeding through the conduit 140 into the spout 128. The flexible tube 142 is connected to a header 143, carried by and constituting a part of the harness 35ª, the spring 34ª being connected to the header, as shown in Figure 5. Flexible tubes 144 are extended laterally from the header 143 and are secured at 145 to the wrists of the operator, the harness 35ª being mounted on the back of the operator. The tubes 142 terminate in suction heads 146 which are adapted to be located in the palms of the hands of the operator.

In practical operation, the cotton is drawn through the suction heads 146, and passes by way of the tubes 144 and the header 143 into the conduit or tube 142, responsive to the suction created by the member 139 in the conduit 141. The cotton in front of the screen 127 is picked up by the rotatable member 130 and is carried downwardly into the path of the blast proceeding from the member 139, through the conduit 140, into the spout 128, the blast driving the cotton out of the rotatable member 130, through the spout 128 into the sack 122.

The rotatable member 130 is driven by a train of elements comprising the shaft 129, the sprocket wheel 131, the chain 132, the sprocket wheel 133, the shaft 135, the sprocket wheels 137, the chain 138, and the shaft 101 of the engine 100.

So long as the operator is standing still during the picking of the cotton, there is no pull on the strap 37ª and on the tongue 36ª. Under such conditions, the spring 120 holds the clutch member 117 of Figure 9 out of engagement with the clutch member 149, the axle 106 remaining at rest, and the sleeve 147 rotating upon the axle responsive to the drive derived from the engine 100 through the shaft 101, the beveled pinions 102, the shaft 103, the worm 108 and with worm wheel 107. When, however, the operator exerts a pull on the strap 37ª and the tongue 36ª, the bell crank 110 is tilted, and the finger 115 of the bell crank, coacting with the groove 116 of the clutch member 117, advances the clutch member 117 until it engages the clutch member 149. Thereupon, rotation is imparted to the axle 106, from the engine 100 by the shaft 101, the beveled pinions 102, the shaft 103 the worm 108, the worm wheel 107, the sleeve 147, the clutch member 149, the clutch member 117 and the spline 118. The vehicle thereupon moves forwardly under the impulse of the engine 100, so long as the operator exerts a pull on the strap 37ª, but when the pull on the strap 37ª is relieved, when the operator stops to pick cotton, the clutch parts are restored to the position of Figure 9, under the action of the spring 120, and the forward movement of the vehicle stops. The truck is steered in Figure 5 in the same manner as is the case with that form of the invention which is shown in Figure 1.

What is claimed is:—

1. In a device of the class described, a truck comprising a wheel-mounted frame; a steering means for the truck, including an elevated part; and means assembled with said part for aiding in supporting the body of an operator whilst the operator is standing on the ground.

2. In a device of the class described, a truck comprising a wheel-mounted frame; a steering means for the truck, including an elevated part; means for aiding in supporting the body of an operator whilst the operator is standing upon the ground; and a yieldable connection between the last specified means and said part.

3. In a device of the class described, a truck comprising a frame; shafts journaled on the frame; ground wheels carried by the shafts; another shaft journaled on the frame; means assembled with said other shaft for aiding in supporting the body of an operator whilst the operator is standing on the ground; and means for connecting said other shaft operatively with the first-specified shafts, to secure a steering of the vehicle by means of the movements of the body of the operator.

4. In a device of the class described, a truck comprising a frame including standards; shafts journaled on the standards; ground wheels carried by the shafts; a drag link connecting the shafts; another shaft journaled on the frame; means for connecting said other shaft with the drag link; and means assembled with said other shaft for aiding in supporting the body of an operator whilst the operator is standing on the ground, said means being effective to impart rotation to said other shaft, thereby to effect a steering of the vehicle.

5. In a device of the class described, a truck including a ground wheel; means for propelling the truck; means under the control of an operator standing in front of the truck for coupling the propelling means to the wheel; a suction conduit accessible to an operator standing in front of the truck; mechanism for creating a suction in the conduit; means for connecting said mechanism with the propelling means; and a receptacle on the truck, whereinto the suction conduit discharges.

6. In a device of the class described, a truck comprising a ground wheel; means for propelling the truck; means for coupling the propelling means to the wheel, said means embodying a member adapted to be engaged about the body of an operator standing in front of the truck; a suction conduit; means for connecting the suction conduit to the body of an operator and in front of the truck; mechanism for creating suction in the conduit; means for connecting said mechanism operatively with the propelling means; and a receptacle on the truck, whereinto the conduit discharges.

7. In a device of the class described, a truck including a ground wheel; an engine on the truck; means for connecting the engine with the ground wheel; a clutch interposed in the last specified means; a member adapted to be engaged about the body of an operator standing in front of the truck, said member being connected operatively to the clutch; and suction means located in front of the truck and driven by the engine.

8. In a device of the class described, a truck; means for propelling the truck; a suction means on the truck; mechanism adapted to be connected to the body of an operator standing in front of the truck, for controlling the propelling means; and means for mounting the suction means on the body of an operator standing in front of the truck.

9. In a device of the class described, a truck; a propelling means for the truck; mechanism adapted to be connected with the body of a person standing in front of the truck for controlling the operation of the propelling means; a header; means for connecting the header with the body of a person standing in front of the truck; a suction tube assembled with the header; means for connecting the suction tube to the arm of a person standing in front of the truck; and means on the truck for creating suction in the header.

In testimony that I claim the foregoing as my own, I have hereto affixed my signature in the presence of two witnesses.

JOHN L. AZBILL.

Witnesses:
HENRY E. HANAREL,
J. H. AZBILL.